CONTROLLED SIDEBAND MODULATOR

Filed Dec. 21, 1964 4 Sheets-Sheet 1

INVENTOR
S. DARLINGTON
BY G. E. Kersey
ATTORNEY 3,381,243
CONTROLLED SIDEBAND MODULATOR Sidney Darlington, Passaic Township, Morris County, N.J., assignor to Bell Telephone Laboratories, Incorporated, New York, N.Y., a corporation of New York Filed Dec. 21, 1964, Ser. No. 419,863
5 Claims. (Cl. 332—45)

ABSTRACT OF THE DISCLOSURE

A modulator using dispersive delay lines to achieve single sideband or vestigial sideband modulation is disclosed. A first dispersive delay line disperses the frequency constituents of an amplitude modulated, swept frequency carrier in the time domain. Those frequency constituents arriving at the output of the first delay line during a selected interval of each sweep period are gated into a second dispersive delay line which re-disperses them in the frequency domain to obtain a single or vestigial sideband. The re-dispersed constituents are then applied to a mixer where the sweep frequency carrier is replaced by a constant frequency carrier.

This invention relates to modulation systems and more particularly to the controlled generation of sidebands in such systems.

In the course of modulation, signalling information is applied to a carrier. The information thus applied is typically contained in a band of frequencies which straddle the carrier and constitutes upper and lower sidebands. Since both sidebands contain the same information, economy of transmission bandwidth is achieved by curtailing one of them. When a sideband is partially eliminated, the result is vestigial sideband modulation. When the sideband is eliminated completely, together with the unmodulated carrier, the result is single sideband modulation.

Either result can be achieved by filtering a conventional amplitude modulated carrier. Alternatively, single sideband signals can be generated directly by combining outputs of balanced modulators in which, for one of the modulators, both the carrier and the modulating signal are shifted in phase by ninety degrees. In the case of filtering, the cut-off characteristic of the filter is critical, particularly with single sideband modulation. When balanced modulators are used, the phase shift conditions are equally critical.

Accordingly, it is an object of the invention to facilitate the controlled generation of modulation sidebands; a related object is to do so for single sideband and vestigial sideband signals. A further object is to eliminate the need for critical filtering and phase shifting in the generation of controlled sideband signals. Another object is to provide a system which is adaptable to the generation of either vestigial sideband or single sideband signals.

In accomplishing the foregoing and related objects, the invention provides for transforming successive segments of a modulating signal into an analogue representation of its Fourier transform, followed by an inverse transformation of a selected portion of each segment. The ordinary Fourier transform of a time varying signal gives the frequency spectrum of the signal as a function of frequency. In the analogue representation here considered, time is the analogue of frequency; it thus provides a time display of the frequency spectrum.

During each segment interval, the wave resulting from the transformation represents positive frequencies of the original modulating signal for one-half of the interval, and negative frequencies during the remainder of the interval. Consequently the extent to which the wave is re-transformed determines the frequency constituents of the ultimate output.

As a preliminary to the initial transformation, a sweep-frequency replica of the modulating signal is provided by a carrier whose frequency is swept periodically and whose envelope is that of the modulating signal. The sweep interval of the carrier determines the segment interval of the modulating signal. The initial transformation is accomplished by applying the modulated sweep-frequency carrier to a first delay line having a phase delay that changes with frequency. Because of interaction between the phase delay of the line and the frequency sweep of the carrier, there is both dispersion of the various frequency constituents of the modulated carrier and compression of the signals associated with each frequency constituent of the modulating signal. A modulating signal can be considered as having both positive and negative frequency constituents; the former appear at the output of the line during one-half of the sweep interval and the latter appear during the ensuing half of the interval.

A desired portion of the transformed wave is selected by controllably gating the output of the first dispersive line to a second dispersive line. When the delay characteristic of the second line is complementary to that of the first line, the frequency constituents of the wave gated to the second line are re-dispersed. More specifically, if the delay of the first dispersive delay line varies directly with frequency, then the second dispersive delay line, possessing a complementary delay characteristic, will have a delay that varies inversely with frequency, or vice versa. In this context, the second dispersive delay line is referred to as a complementary dispersive delay line since it complements the effects of the first dispersive delay line. In the absence of gating, the output of the second line would be the same as the input to the first line, except for delay. However, if the gate is active for one-half of the sweep cycle, it passes either the positive or the negative frequency constituents of the original modulating signal. The resultant output is a single sideband modulated wave.

Where the gate operates according to a prescribed weighting function for more than one-half cycle, the result is a vestigial sideband wave dependent on the weighting characteristic.

According to one aspect of the invention, if the sweep characteristic at the output of the first dispersive line is reversed by using an auxiliary oscillator, the second dispersive line may be a duplicate of the first, instead of having a complementary characteristic.

According to another aspect of the invention, the gating can be arranged so that a double sideband set of frequency multiplex signals is transformed into a single sideband set of signals requiring one-half of the original overall bandwidth.

Other aspects of the invention will become apparent after considering several illustrative embodiments, taken in conjunction with the drawings in which.

Figure 1:
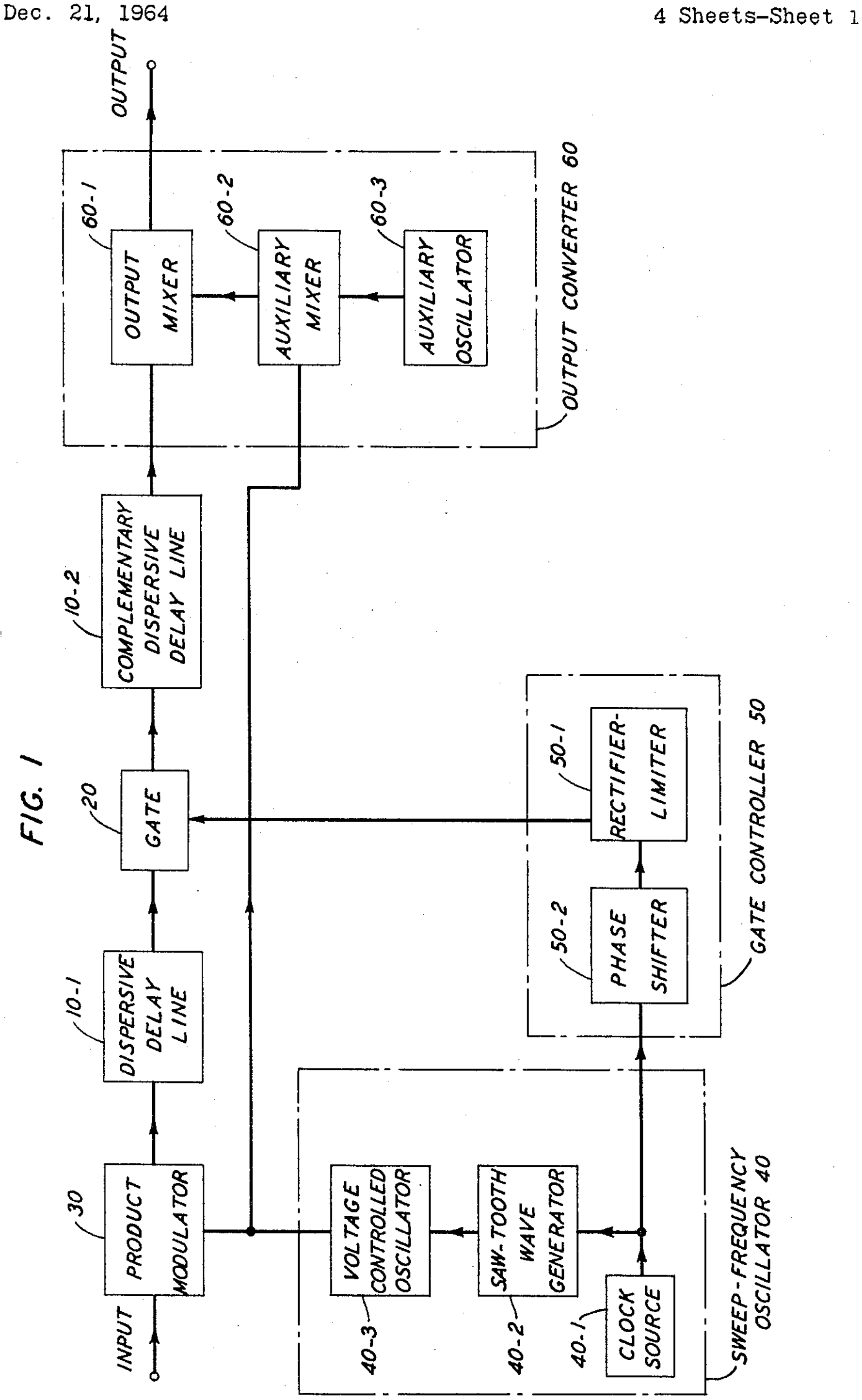
FIG. 1 is a block diagram of a single sideband modulation system in accordance with the invention.

With reference to FIG. 1, a single sideband wave is derived by dispersing a sweep-frequency replica of an incoming modulating signal in a first delay line 10–1 and by passing a portion of each dispersed replica through a gate 20 into a second delay line 10–2. The second line 10–2 has a delay characteristic which is complementary to that of the first line 10–1 and, hence, re-disperses the wave applied to it. After being re-dispersed, the wave contains a residual sweep which is removed by an output converter 60.

To achieve appropriate dispersion, the delay lines 10–1 and 10–2 are constructed so that the various frequency constitutents of signals applied to it are delayed differently during propagation. Suitable dispersive lines with linear delay characteristics are discussed in W. P. Mason, Physical Acoustics, vol. 1A, p. 424 (1964).

The sweep-frequency replica at the input to the first dispersive line 10–1 is produced by mixing the incoming modulating signal with the output of a sweep-frequency oscillator 40 in a conventional product modulator 30. Included in the sweep-frequency oscillator 40 is a clock source 40–1 of sinusoidal oscillations which cyclically activate a saw-tooth generator 40–2. The output of the saw-tooth generator 40–2 changes linearly during each clock cycle, causing a corresponding variation in the frequency of a voltage controlled oscillator 40–3. A representative saw-tooth output is illustrated in Mathematics of Circuit Analysis, E. A. Guillemin, John Wiley, p. 464, New York, 1949.

As a result of the frequency sweep, together with dispersion produced by the first delay line 10–1, the wave propagated by the line is transformed so that it represents negative frequency constituents of the modulating signal during one-half of each sweep interval and positive frequency constituents during the remainder of each sweep interval.

After being transformed by the first delay line, the propagated signals are gated to the second line 10–2. The gate is operated for one-half of each sweep interval by a gate controller 50 which includes a rectifier-limiter 50–1. The rectifier-portion of the rectifier-limiter converts the sinusoidal oscillations of the clock source 40–1 into a train of half wave signals which are shaped into a pulse train by the limiter portion of the rectifier-limiter. Preceding the rectifier-limiter 50–1 in the gate controller 50 is a phase shifter 50–2 to compensate for the average delay of the first dispersive line 10–1.

If it were not for the gating, the complementary characteristic of the second dispersive line 10–2 would merely reverse the frequency dispersion that has taken place on the first line 10–1. In that event, the output of the second line would be the same as the input to the first line, except for delay.

Because of the half cycle gating, however, the transformed signals present at the output of the second dispersive line 10–2 correspond to either positive frequency or negative frequency constituents, as delayed, of the original modulating signal. Consequently the output of the second line is a single sideband modulated wave as desired.

In addition the output of the second line 10–2 also contains a sweep-frequency characteristic which is removed by an output mixer 60–1. The latter derives its mixing signal from the sweep-frequency oscillator 40 and an auxiliary oscillator 60–3 by way of an auxiliary mixer 60–2. Both mixers 60–1 and 60–2 include noncritical filters, for passing the difference frequency constituents that are produced by mixing. As a result the outgoing wave has the same average frequency as the auxiliary oscillator 60–3.

The foregoing explanation of the modulator can be summarized in mathematical terms. Assuming that the incoming modulating signal is $s_k(t)$ in a period T of the oscillations produced by the clock source, the output of the mixer 30 (FIG. 1) takes the form:

$$s_k(t) \cos\left(\omega_c t - \frac{1}{2} q t^2 + \beta\right) \qquad (1)$$

where $\omega_c$ is the average frequency of the voltage controlled oscillator, $\omega_c - qt$ is the instantaneous frequency of the sweep-frequency oscillator, $q$ is a constant which determines the rate at which the frequency changes with time, and $\beta$ is a constant phase angle.

The phase angle $\beta$ is a part of the cumulative phase shift associated with the modulation process. Phase does not otherwise affect the modulation and it is not considered further.

Ignoring phase shift, the impulse response of the first dispersive line is approximately proportional to:

$$2 \cos\left(\omega_c t + \frac{1}{2} q t^2\right) \qquad (2)$$

where $q$ is now a constant of the dispersive line and is adjusted to be substantially the same as the constant which represents the rate of change of frequency of the sweep-frequency oscillator.

Such a line is said to have a linear envelope phase delay with frequency for those frequencies where the Fourier transform of the response has phase slope which is substantially linear with frequency.

The constant $q$ also determines the scale factor in the analogue representation of frequency by time; it is desirably chosen so that the frequency constituents of the original modulating signal are substantially displayed in the sweep interval.

The output of the first dispersive line is the convolution of the impulse response of the line with the input to the line. Convolution is a well known mathematical integration as discussed in Probability and Information Theory, P. M. Woodward, McGraw-Hill, p. 8, New York, 1955. The integral is evaluated with respect to the sweep interval T by virtue of the way in which the constant $q$ has been proportioned. For convenience of mathematical formation, the interval may be stated as ranging from $$-\frac{T}{2} \text{ to } +\frac{T}{2}$$

When the average frequency of the sweep-frequency oscillator 40 is sufficiently high that a double frequency term in the integrand of the convolution has a negligibly small effect, because of substantial cancellation of positive and negative fluctuations, the output approximates:

$$\begin{aligned} \int_{-\frac{T}{2}}^{+\frac{T}{2}} s(\tau) \cos\left(\omega_c t + \frac{1}{2} q t^2 - q t \tau\right) d\tau \\ = R_k(qt) \cos\left(\omega_c t + \frac{1}{2} q t^2\right) \\ - X_k(qt) \sin\left(\omega_c t + \frac{1}{2} q t^2\right) \end{aligned} \qquad (3)$$

where $R_k(qt)$ is a time varying signal corresponding to the real part of the frequency spectrum $$R_k(\omega) = \int_{-\frac{T}{2}}^{+\frac{T}{2}} s(\tau) \cos(\omega\tau) d\tau$$

$X_k(qt)$ is a time varying signal corresponding to the imaginary part of the frequency spectrum $$X_k(\omega) = -\int_{-\frac{T}{2}}^{+\frac{T}{2}} s(\tau) \sin(\omega\tau) d\tau$$

and $\tau$ is the duration of the sweep interval T.

The portion of $R_k(qt)$ and $X_k(qt)$ in the interval $$-\frac{T}{2}$$

to zero corresponds to negative frequency constituents of the modulating signal $s_k(t)$, while the portion of $R_k(qt)$ and $X_k(qt)$ in the interval from $$0 \text{ to } +\frac{T}{2}$$

corresponds to positive frequency constituents of the modulating signal $s_k(t)$.

The impulse response of the second dispersive line is similar to that of the first line, except for a change in sign because of its complementary characteristic, being proportional to:

$$\cos\left(\omega_c t - \frac{1}{2} qt^2\right) \quad (4)$$

Hence the output of the second dispersive line is represented by the convolution of Equations 3 and 4 which, because of the gating, is integrated over one-half of the oscillatory period of the clock source, i.e., from $$-\frac{T}{2} \text{ to } 0$$

or from $$0 \text{ to } +\frac{T}{2}$$

The result of this convolution integrated from $$0 \text{ to } +\frac{T}{2}$$

is:

$$s_k(t) \cos\left(\omega_c t - \frac{1}{2} qt^2\right) + s_{kh}(t) \sin\left(\omega_c t - \frac{1}{2} qt^2\right) \quad (5)$$

where $s_k$, $(t)$, $\omega_c$ and $q$ are as defined previously and $s_k(t)$, $\omega_c$ and $q$ are as defined previously and upper limit off the bandwidth of the modulating signal $s_k(t)$:

If $$s_k(t) = \int_{\omega=0}^{\omega_m} A\omega \cos(\omega t + \beta\omega) d\omega$$

Then $$s_{kh}(t) = -\int_{\omega=0}^{\omega_m} A\omega \sin(\omega t + \beta\omega) d\omega$$

Equation 5 contains both the original modulating signal multiplied by a carrier and a phase shifted replica of the signal multiplied by a phase shifted carrier. Hence the result is a single sideband wave as desired.

For the specific example of $s_k(t) = \cos \omega_m t$, Equation 5 reduces to:

$$\cos \omega_m t \cos\left(\omega_c t - \frac{1}{2} qt^2\right)$$

$$-\sin \omega_m t \sin\left(\omega_c t - \frac{1}{2} qt^2\right)$$

$$= \cos\left(\omega_c t + \omega_m t - \frac{1}{2} qt^2\right) \quad (6)$$

When the variable frequency component $qt$ is removed by the output mixer, the result is $$\cos(\omega_c' t + {}_m t)$$

where $\cos \omega_c'$ is the resultant carrier.

Figure 2A:
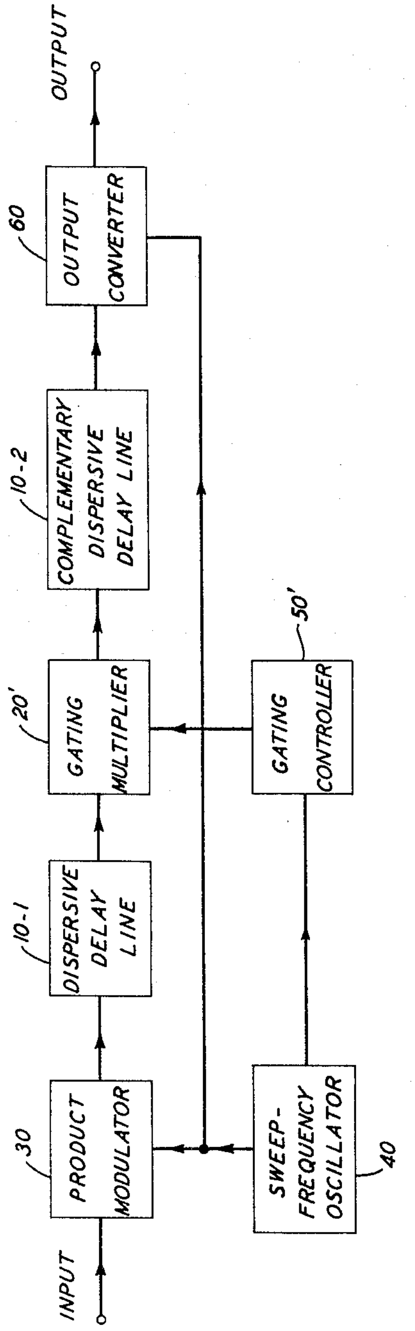
FIG. 2A is a block diagram of a modification of FIG. 1 for producing vestigial sideband modulation.
Figure 2B:
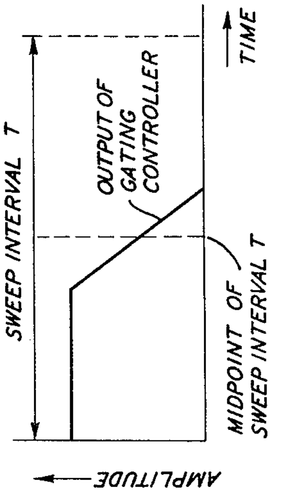
FIG. 2B is a graph applicable to the modulation system of FIG. 2A.

A modification of the modulation system of FIG. 1 for producing vestigial sideband modulation is shown in FIG. 2A. In the embodiment of FIG. 2A the gate 20 of FIG. 1 is replaced by a gating multiplier 20′ whose input are the output of the first dispersive line 10–1 and the output of a gating controller 50′. The gating controller 50′ is a weight function generator of conventional design that operates from the sweep frequency oscillator 40 over an interval according to the kind of modulation desired. In the case of vestigial sideband modulation, the weight function has the form shown in FIG. 2B, being at full amplitude for less than one-half of the sweep interval T and then tapering to zero beyond the midpoint of the sweep interval T. Because of the multiplication effect of the multiplier 20′ the output of the multiplier has the amplitude pattern of FIG. 2B. Consequently the frequency constituents that are applied to the dispersive line 10–2 represent full amplitudes over substantially one-half of the sweep interval T and partial amplitudes that taper to zero beyond the midpoint of the sweep interval T. As a result the output of the modulation system in FIG. 2A is a modulated wave with a vestigial sideband as desired.

Figure 3:
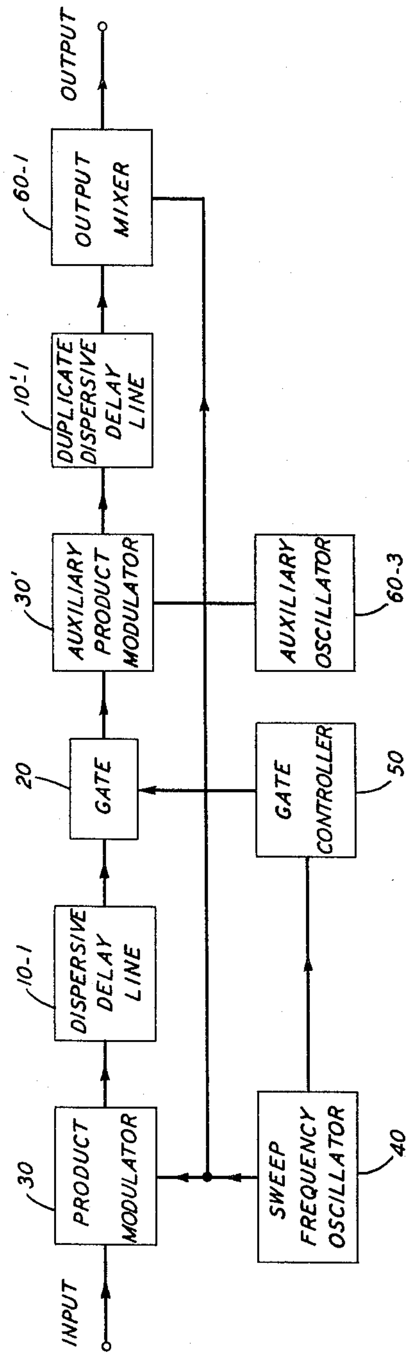
FIG. 3 is a block diagram of a single sideband modulation system which is alternative to that of FIG. 1.

An alternative embodiment of the modulation system of FIG. 1 is given by FIG. 3. For the embodiment of FIG. 3 both of the dispersive lines 10–1 and 10′–1, which respectively precede and follow the gate 20, have the same delay characteristic. This is made possible by the introduction of an additional product modulator 30′ between the gate 20 and the second dispersive line 10′–1 and by the use of a fixed frequency oscillator 60–3 whose output frequency is double the average frequency of the sweep frequency oscillator 40. The auxiliary product modulator 30′ includes a non-critical filter which selects the difference frequency constituent that is produced by it. In effect the difference frequency constituent provides the second dispersive line 10′–1 with a complementary input so that its output is the same as that of the complementary dispersive line 10–2 in FIG. 1. Because the direction of the sweep is reversed in the auxiliary product modulator 30′, the auxiliary oscillator 60–3 of FIG. 1 is no longer required at the output mixer 60–1 and instead operates in conjunction with the auxiliary modulator 30′. The sweep frequency constituent at the output of the second dispersive line 10′–1 is removed by direct mixing with the output of the sweep frequency oscillator 40. As a result, the carrier frequency of the single sideband wave is twice the average frequency of the sweep oscillator.

Figures 4A, 4B:
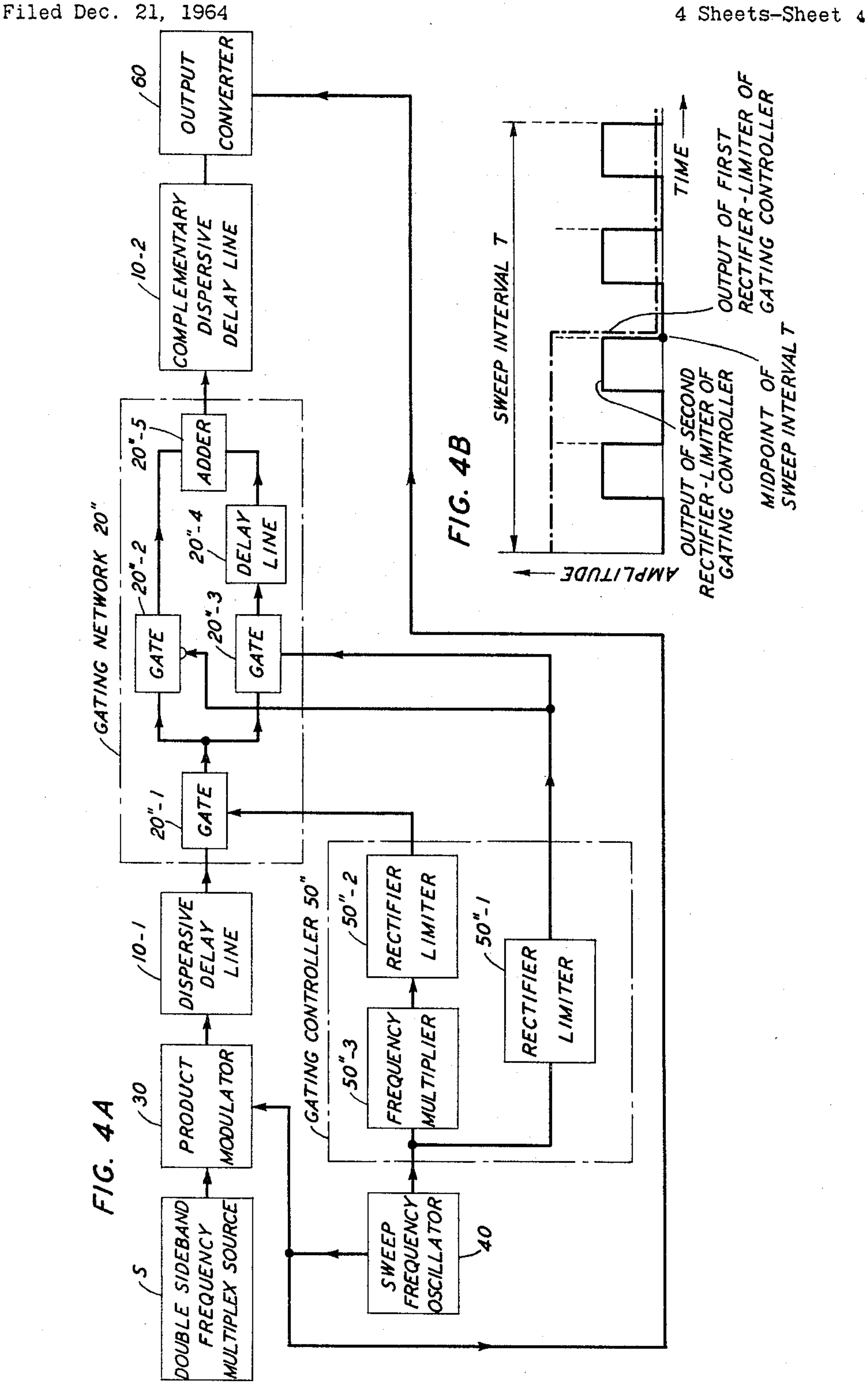
FIG. 4A is a block diagram of a single sideband multiplex system in accordance with the invention.
FIG. 4B is a graph applicable to the modulation system of FIG. 4A.

A further embodiment of the invention, as applied to the generation of single sideband multiplex signals, is set forth in FIG. 4A. In this embodiment, double sideband signals from a frequency multiplex source S are applied to a product modulator 30 as in FIG. 1. Consequently the output of the first dispersive line 10–1 is a transformed wave which represents alternate bands of positive and negative frequency constituents for the successive multiplex channels during each sweep interval. If each pair of sidebands in the transformed wave were to be gated as in the modulation system of FIG. 1, the result at the output of the second dispersive line 10–2 would be a single sideband multiplex wave in which the sidebands would be separated on the frequency scale by gaps from which their companion sidebands had been removed. In order to reduce the gaps, a gating network 20″ is employed containing two separate kinds of gates. The first kind of gate 20″–1 is operated to select transformation signals which correspond to either positive or negative frequencies of the multiplex modulating signals during the sweep interval T. Where there are four channels the gate is active over four pulse intervals, as shown in FIG. 4B. The gating pulse signals are derived from a rectifier-limiter 50″–1 in conjunction with a frequency multiplier 50″–3.

The second kind of gating takes place during respective halves of the sweep interval T. It employs an inhibit gate 20″–2 and a companion gate 20″–3. Gate 20″–3 is activated from a rectifier-limiter 50″–2 of the gating control 50″ during the same interval that gate 20″–2 is inhibited. Consequently during the second half of the sweep interval gate 20″–3 is inactive while gate 20″–2 allows signals to pass through it. Because of a delay element 20″–4 on the second gating path, the selected transformation signals are interleaved with those on the first gating path by an adder 20″–5. As a result, the ultimate output represents the third, first, fourth, and second channels in that sequence.

Other adaptations and embodiments of the invention will occur to those skilled in the art.

I claim:

1. A controlled sideband modulator comprising:
- an input to which a modulating signal is applied,
- a sweep frequency oscillator,
- a product modulator connected to said input and to said sweep frequency oscillator for generating a modulated signal,
- a gate,
- a first dispersive delay line interconnecting said gate with said product modulator for generating a time display of said modulated signal's positive and negative frequency constituents during each sweep period of said sweep frequency oscillator,
- a gate controller interconnecting said sweep frequency oscillator with said gate for enabling said gate to pass those frequency constituents appearing at the output of said first dispersive delay line during at least one half of each of said sweep periods,
- an output converter,
- and a second dispersive delay line interconnecting said converter with said gate for re-dispersing the time display of the selected frequency constituents.

2. Apparatus for deriving a modulated wave from a modulating signal which comprises:
- means for generating a sweep frequency replica of said modulating signal,
- first delay means for dispersing the plus and minus frequency constituents of said sweep frequency replica in the time domain,
- second delay means for dispering the frequency constituents of signals applied thereto,
- and means, controlled by the generating means, for gating the dispersed frequency constituents appearing at the output of said first delay means during one half of each sweep period to said second delay means to obtain a single sideband at the output of said second delay means.

3. A controlled sideband modulator comprising a sweep frequency oscillator,
- means for modulating the output of said sweep frequency oscillator by a modulating signal,
- a first dispersive delay line connected to the modulating means for generating a display of upper and lower sideband frequency constituents as a function of time during each sweep period,
- a second dispersive delay line having a delay characteristic complementary to that of said first dispersive delay line for re-dispersing those frequency constituents applied to it,
- gating means interconnecting said first dispersive delay line with said second dispersive delay line,
- and control means connected to said sweep frequency oscillator for controllably operating said gating means for one half of each of said sweep periods.

4. Apparatus for converting a double sideband multiplex wave into a single sideband multiplex wave, which comprises:
- means for generating a carrier that is periodically swept in frequency,
- means for modulating said carrier by said double sideband wave,
- means for dispersing the modulated carrier into successive bands of frequency constituents over the sweep period,
- means for gating the frequency constituents occupying one half of each band,
- means for packing the gated constituents into an interval less than said sweep period,
- and means for re-dispersing the packed frequency constituents to obtain a single sideband multiplex wave.

5. The controlled sideband modulator of claim 1 wherein said gating means is enabled for a fractional portion of each of said sweep periods, which is greater than one half of said period, to obtain a vestigial sideband at the output of said second delay means.

References Cited

UNITED STATES PATENTS

| | | | |
|---|---|---|---|
| 1,666,206 | 4/1928 | Hartley | 332—45 |
| 2,678,997 | 5/1954 | Darlington | 325—125 X |
| 2,954,465 | 9/1960 | White | 325—332 X |
| 2,987,683 | 6/1961 | Powers | 332—45 |
| 3,328,528 | 6/1967 | Darlington | 179—15 |

ALFRED L. BRODY, *Primary Examiner.*